E. S. WINCHESTER.
Carriage-Wheel.
No. 51,251.
Patented Nov. 28, 1865
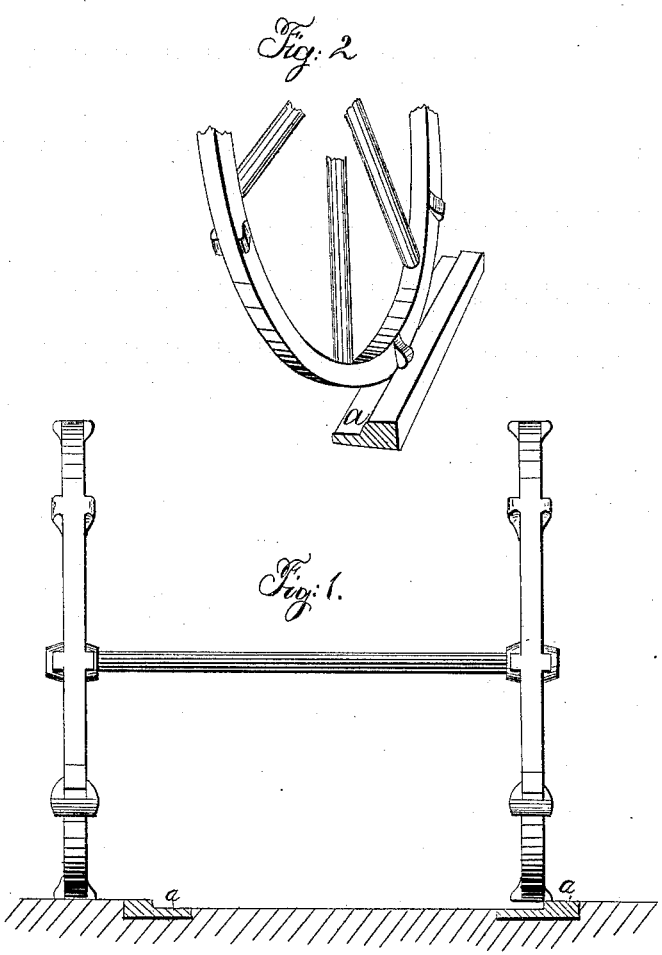

UNITED STATES PATENT OFFICE.

EDWARD S. WINCHESTER, OF BOSTON, MASSACHUSETTS.

IMPROVED CARRIAGE-WHEEL.

Specification forming part of Letters Patent No. 51,251, dated November 28, 1865.

*To all whom it may concern:*

Be it known that I, EDWARD S. WINCHESTER, of Boston, in the county of Suffolk and State of Massachusetts, have invented new and useful Improvements in Carriage-Wheels; and I do hereby declare that the following, taken in connection with the drawings which accompany and form part of this specification, is a description of my invention sufficient to enable those skilled in the art to practice it.

It is well known that the drivers of ordinary vehicles about streets which are laid with lines of rails for car-tracks constantly experience much trouble, annoyance, and danger even from the difficulty of extricating the wheels of their vehicles from such tracks or lines of rails. By not being able to turn out of the ruts which the rails form with anything of precision or celerity, disastrous collisions frequently take place and all of the pleasure and comfort of driving are lost, and in turning out of the ruts of the rail-tracks severe wrenching of vehicles ensues.

To obviate or lessen all of the before-named troubles and annoyances is the object of my invention, which consists in placing upon the fellies of wheels projections therefrom which come flush with the periphery of the tire, and which are of suitable form and material, and are strongly enough secured to the wheel so that they will in the revolution of the wheels, when swerved from the direction of the track, catch upon the highest part of the rail, and, bearing their proportion of the load, serve as points or pivots for the wheels to swerve to one side upon, while at the same time the wheels are lifted thereupon from the ruts of the rails to a level with their highest parts.

Referring to the drawings, Figure 1 shows in elevation an axle with a pair of wheels thereupon, said wheels showing my invention. This figure also shows a road-bed and a rail-track in section. Fig. 2 is a perspective view of part of a wheel and a rail, also illustrating my invention.

The projections from the fellies of the wheels are clearly shown, and may be placed on the outside or on both sides of the fellies. They may be secured to the wheels in any proper or desirable way. This, however, is not of the essence of my invention.

It may be remarked that the projections may be welded to the tire, and may be bent down upon the felly and riveted or bolted through its sides; or the projections may be put upon the fellies in the form of bands under the tire, or as U-shaped pieces, bolted and secured in any desirable way to attain the greatest strength possible; but, however shaped and however secured, the projections must come flush with the periphery of the tire.

In Fig. 1 the gage of the wheels is too wide to run in the track. If it is desired to have a vehicle with this improvement thereupon run in the track, then the extreme distance from the outside of the outer projections on one wheel to a similar point on the other wheel on the same axle should be a little less than the distance between the shoulders *a a* of the rails.

On the right of Fig. 1 the wheel is shown as poised on the highest part of the rail on one of the projections from the felly. It will be obvious that in such condition the wheel can be swung on this projection, as on a pivot, to an angle with the track, and that there will then be no difficulty in moving off from and over the track. Fig. 2 shows in perspective a wheel in the same condition with the wheel on the right in Fig. 1.

It often happens that the right-hand wheel of a vehicle is running in the left rail of a track, and vice versa. If then it is desired to turn the vehicle out of the track without crossing the other rail, the projections on the inner side of the fellies are the operative ones.

I claim—

Providing wheels with projections arranged to operate substantially as set forth.

In witness whereof I have hereunto set my hand this 17th day of February, A. D. 1865.

EDWARD S. WINCHESTER.

In the presence of—
J. B. CROSBY,
W. B. GLEASON.